(12) United States Patent
Colom Ikuno

(10) Patent No.: US 11,589,400 B2
(45) Date of Patent: Feb. 21, 2023

(54) METHOD FOR SETTING UP AND FOR APPLICATION OF EXPECTED COMMUNICATION BEHAVIOR AND IN COMMUNICATION SYSTEM

(71) Applicant: Deutsche Telekom AG, Bonn (DE)

(72) Inventor: Josep Colom Ikuno, Korneuburg (AT)

(73) Assignee: DEUTSCHE TELEKOM AG, Bonn (DE)

( * ) Notice: Subject to any disclaimer, the term of this patent is extended or adjusted under 35 U.S.C. 154(b) by 57 days.

(21) Appl. No.: 17/228,785

(22) Filed: Apr. 13, 2021

(65) Prior Publication Data

US 2021/0321466 A1    Oct. 14, 2021

(30) Foreign Application Priority Data

Apr. 14, 2020   (EP) ..................................... 20169336

(51) Int. Cl.
   *H04W 76/10*   (2018.01)
   *H04L 67/14*   (2022.01)
   *H04W 16/02*   (2009.01)

(52) U.S. Cl.
   CPC ............. *H04W 76/10* (2018.02); *H04L 67/14* (2013.01); *H04W 16/02* (2013.01)

(58) Field of Classification Search
   CPC ....... H04W 76/10; H04W 16/02; H04W 8/18; H04W 4/50; H04L 67/14
   See application file for complete search history.

(56) References Cited

U.S. PATENT DOCUMENTS

| | | | |
|---|---|---|---|
| 10,158,567 B1 * | 12/2018 | Zhang | ................. H04L 12/4633 |
| 2019/0182875 A1 * | 6/2019 | Talebi Fard | ............ H04W 8/18 |
| 2019/0261260 A1 * | 8/2019 | Dao | ................... H04W 36/0011 |
| 2019/0357301 A1 * | 11/2019 | Li | .......................... H04W 80/10 |
| 2020/0045753 A1 * | 2/2020 | Dao | ........................ H04W 4/08 |

FOREIGN PATENT DOCUMENTS

| | | | | |
|---|---|---|---|---|
| WO | WO-2019194954 A1 * | 10/2019 | ............ | H04W 28/16 |
| WO | WO-2020102795 A1 * | 5/2020 | ............ | H04W 76/12 |

* cited by examiner

*Primary Examiner* — Kevin T Bates
*Assistant Examiner* — Ranjan Pant
(74) *Attorney, Agent, or Firm* — Leydig, Voit & Mayer, Ltd.

(57) ABSTRACT

A communication system includes an external entity and a 5G system (5GS), wherein the 5GS comprises a 5G core (5GC), wherein the 5GC comprises a functional entity, a Unified Data Management (UDM), a Session Management Function (SMF), and a User Plane Function (UPF). A method for setting up expected communication behavior information in the system includes: performing, by the external entity, an Application Programming Interface (API) call via an API of the functional entity and setting up an expected communication behavior for a subscriber or set of subscribers, a data network name (DNN), a 5G virtual network (VN), a slice or a combination thereof that the functional entity is allowed to manage.

12 Claims, 6 Drawing Sheets

METHOD FOR SETTING UP AND FOR APPLICATION OF EXPECTED COMMUNICATION BEHAVIOR AND IN COMMUNICATION SYSTEM

CROSS-REFERENCE TO PRIOR APPLICATION

Priority is claimed to European Patent Application No. EP 20169336.3, filed on Apr. 14, 2020, the entire disclosure of which is hereby incorporated by reference herein.

FIELD

The invention relates to a method for setting up and a method for application of expected communication behavior in a communication system and a communication system thereof. In more detail, the communication system of the invention relates to a 5G system (5GS) and an external entity.

BACKGROUND

One of the 5GS requirements included in 3GPP TS 22.261 is related to exposure of network capabilities to external entities, i.e. third-party entities. In detail, TS 22.261 specifies that the 3GPP network shall be able to provide suitable and secure means to enable an authorized external entity to provide the 3GPP network via encrypted connection with the expected communication behavior of user equipment(s) (UE(s)), wherein the expected communication behavior is, for instance, the application servers a UE is allowed to communicate with, the time a UE is allowed to communicate, or the allowed geographic area of a UE.

Further, the authorized external entity shall provide via encrypted connection the 3GPP network with the actions expected from the 3GPP network when detecting behavior that falls outside the expected communication behavior, wherein such actions can be, for instance, to terminate the UE's communication, to block the transferred data between the UE and the not allowed application.

In the following specification, the term allowed UE communication behavior is employed to refer to: addresses or UEs that a UE is allowed to communicate to and the action the 5GS should take when a UE sends packets to an address or UE it is not allowed to communicate to.

Furthermore, deployment cases where functional entities of a 5GS may be deployed in mixed settings, where, for example, an enterprise customer would run local parts of a 5GS on their information technology (IT) system, are being considered in 3GPP. In particular, it considers the case of Non-Public Networks (NPNs), also often referred to as "Campus Networks" or "Private Networks", the case that the 5G non-public network is deployed on the organization's defined premises, such as a campus or a factory, due to the high quality of service (QoS)/security requirements, or to be isolated from other networks as a form of protection, etc.

Additionally, 5G, in its Release 15 (TS 23.501, 3.1 Definitions) provides some methods for providing Ethernet connectivity besides IP and for grouping subscribers in groups via 5G LAN-Type Services.

FIG. 1 illustrates an exemplary 5G system (5GS) comprising a user equipment (UE), an access network (AN), and a core network (CN), where the 5GS provides connectivity to UEs connected via an access network (e.g. 5G New Radio gNBs or WiFi) and a 5G core (5GC) provides connectivity to a data network (DN, e.g. the Internet). The 5GS can enable communication between UEs, between UEs and one or more DNs or a combination of both.

FIG. 2 illustrates part of the 5G system architecture as standardized by 3GPP. A user equipment (UE), e.g. a mobile phone or other device, is connected to a radio access network (RAN). The RAN is connected to the User Plane Function (UPF) part of the 5GC, which allows the UE to have connectivity to a data network (DN), e.g. an external data network, such as the Internet.

The 5GC is comprised of Network Functions (NFs), i.e. functional entities, each functional entity tasked with a defined set of responsibilities, as defined in TS 23.501. FIG. 2 illustrates some of these functional entities (the ones that relevant for the invention) such as the Network Exposure Function (NEF), Policy Control Function (PCF), Unified Data Management (UDM), Binding Support Function (BSF), Access and Mobility Management Function (AMF), Session Management Function (SMF), User Plane Function (UPF).

The Network Exposure function (NEF) is tasked, as defined in TS 23.501, 5.20 with supporting external exposure of capabilities of network functions. External exposure can be categorized as Monitoring capability, Provisioning capability, Policy/Charging capability and Analytics reporting capability.

Allowed Address Pairs (AAPs) is a feature associated with virtualization and OpenStack (free open standard cloud computing platform) that allows to add additional IP/MAC addresses to a network port (besides the port's own addresses) to allow traffic that matches those specified values. This address list is commonly referred to as the AAPs of the port.

The conventional state of the art in OpenStack is that the allowed address pair extension extends the port attribute to enable a user or administrator to specify arbitrary media access control (MAC) address/Internet Protocol (IP) address (Classless Inter-Domain Routing (CIDR) supported, e.g. 192.168.100.0/22) pairs that are allowed to pass through a port regardless of the subnet associated with the network.

SUMMARY

In an exemplary embodiment, the present invention provides a method for setting up expected communication behavior information in a communication system. The system includes an external entity and a 5G system (5GS), wherein the 5GS comprises a 5G core (5GC), wherein the 5GC comprises a functional entity, a Unified Data Management (UDM), a Session Management Function (SMF), and a User Plane Function (UPF). The method includes: performing, by the external entity, an Application Programming Interface (API) call via an API of the functional entity and setting up an expected communication behavior for a subscriber or set of subscribers, a data network name (DNN), a 5G virtual network (VN), a slice or a combination thereof that the functional entity is allowed to manage; based on the subscriber or set of subscribers being referred to via an IP address, IP address range, media access control (MAC) address or MAC address range, mapping, at the functional entity, the address or address range to the subscriber or set of subscribers; updating, at the UDM, by adding and storing, expected communication behavior information into subscriber information of one or more subscribers; sending a confirmation, from the functional entity to the external entity, that the setting up of the expected communication behavior for the subscriber or set of subscribers, the DNN, the 5G VN, the slice or the combination thereof has been performed successfully; based on the subscriber or set of subscribers having an active Protocol Data Unit (PDU) session or PDU sessions, wherein the SMF is subscribed in the UDM to changes of subscriber information of the subscriber or set of subscribers of the PDU session or PDU sessions, notifying, from the UDM to the subscribed SMF, of a change in the subscriber information; and for active PDU sessions, performing, from the SMF to the UPF, an N4 session modification procedure and updating the expected communication behavior in the UPF via an N4 interface.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
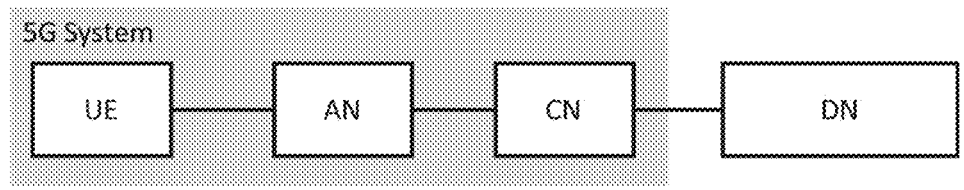
FIG. 1 illustrates an exemplary 5G system.
Figure 2:
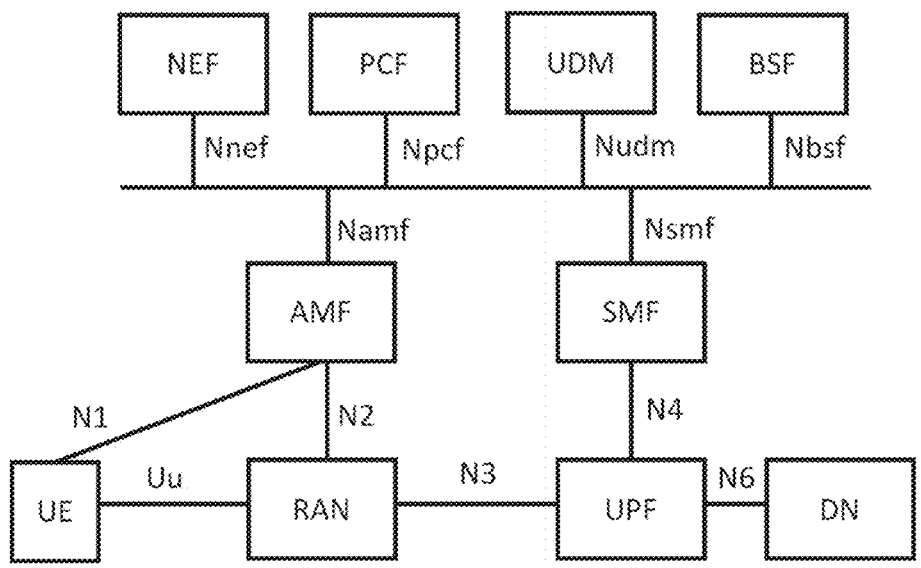
FIG. 2 illustrates some of the Network Functions (NFs) of a 5G Core.

In the present invention, the term AAPs is generalized to also include UE identifiers (e.g. Subscriber Permanent Identifier (SUPI), Generic Public Subscription Identifier (GPSI)). As such, the present invention considers AAPs containing a list of IP, MAC addresses or UE identifiers.

Conventionally, there is no way to make a 5GS aware of UE communication behavior restrictions. An external entity, such as a third-party, would be required to:

Set up allowed UE communication behavior within the 5GS for a given subscriber (e.g. subscriber with SUPI X is only allowed to communicate with IP range A).

Set up allowed UE communication behavior within the 5GS for a given address or address range (e.g. subscribers with IP address in the range X.Y.Z.0/24 are only allowed to communicate with IP range A).

Specify whether traffic falling outside of the allowed UE communication behavior is to be blocked.

Specify to be notified when traffic falling outside of the allowed UE communication behavior is detected.

Exemplary embodiments of the present invention provide a method for making a 5G system aware of UE communication behavior restrictions as defined by an external entity and notify this external entity of non-allowed behavior.

According to a first aspect, the invention provides a method for setting up expected communication behavior information in a communication system, the system comprising an external entity and a 5G system (5GS), wherein the 5GS comprises a 5G core (5GC), wherein the 5GC comprises a functional entity, a Unified Data Management (UDM), a Session Management Function (SMF), and a User Plane Function (UPF), the method comprising the steps: performing, by the external entity, an Application Programming Interface (API) call via an API of the functional entity and setting up an expected communication behavior for a subscriber or set of subscribers, a data network name (DNN), a 5G virtual network (VN), a slice or any combination thereof that the functional entity is allowed to manage; if the subscriber or set of subscribers is referred to via an IP address, IP address range, MAC address or MAC address range, mapping, at the functional entity, the address or address range to a subscriber or set of subscribers, and if the subscriber or set of subscribers is not indicated, this step is skipped; updating, at the UDM, by adding and storing, expected communication behavior information into one or more subscriber's information, wherein the subscriber information indicates none, one or a combination of: DNN, 5G VN group, and/or slice; sending a confirmation, from the functional entity to the external entity, that the setting up of an expected communication behavior for a subscriber or set of subscribers, a DNN, a 5G VN, a slice or any combination thereof, has been performed successfully; if the subscriber or set of subscribers have an active Protocol Data Unit (PDU) session or PDU sessions, wherein the SMF is subscribed in the UDM to changes of subscriber information of the subscriber or set of subscribers of the PDU session or PDU sessions, notifying, from the UDM to the subscribed SMF, of a change in the subscriber information, if the subscriber or set of subscribers have no active PDU sessions, whenever a SMF performs a PDU establishment procedure, the SMF retrieving the subscriber information from the UDM, wherein the retrieved subscriber information contains the updated expected communication behavior information; for active PDU sessions, performing, from the SMF to the UPF, a N4 session modification procedure and updating the expected communication behavior in the UPF via N4 interface; for new PDU session establishments, signaling, via N4 interface, from the SMF to the UPF, the expected communication behavior information.

According to a further aspect, the step of setting up an expected communication behavior for a subscriber or set of subscribers, a DNN, a 5G VN, a slice or any combination thereof that the functional entity is allowed to manage, further comprises subscribing, from the external entity to the functional entity, one or a set of subscribers, DNN, 5G VN, slice or any combination thereof, to notifications of expected communication behavior information; wherein the step of sending a confirmation, from the functional entity to the external entity, that the setting up the expected communication behavior has been performed successfully, the confirmation further comprises that the subscription of one or a set of subscribers, DNN, 5G VN, slice or any combination thereof, to notifications of expected communication behavior information has been performed successfully and subscription information.

According to a further aspect, the method further comprises the steps of: receiving, at the functional entity, a subscriber specified as a Subscriber Permanent Identifier (SUPI); and accessing the subscriber information at the UDM by using the SUPI.

According to a further aspect, the method further comprises the steps of: receiving, at the functional entity, a subscriber specified as a Generic Public Subscription Identifier (GPSI); obtaining, from the UDM, a Subscriber Permanent Identifier (SUPI), by using the GPSI; and accessing the subscriber information at the UDM by using the SUPI.

According to a further aspect, the 5GS further comprises a user equipment (UE), and an access network (AN) providing connectivity between the UE and the 5GC, and the 5GC further comprises a Policy and Charging Function (PCF), and a Binding Support Function (BSF), further comprising the steps of: establishing a PDU session, at the SMF, by performing a PDU establishment procedure of IP type involving the UE, the UDM and the SMF, and linking an IP address or IP prefix to a UE's PDU session and with one or more of a combination of: a Single Network Slice Selection Identifier (S-NSSAI), a 5G virtual network (VN) group, a data network name (DNN), and/or a Subscriber Permanent Identifier (SUPI) associated with the UE's PDU session, and subscribing in the UDM to changes of subscriber information associated with a subscriber identifier (ID) associated with the PDU session; notifying, from the SMF to the PCF, the linked IP address or IP prefix of the UE's PDU session with the associated DNN, S-NSSAI, 5G VN group, and/or SUPI; updating and storing, from the PCF to the BSF, the assigned IP address or IP prefix of the UE's PDU session with the associated DNN, S-NSSAI, 5G VN group, and/or SUPI; registering, from the SMF to the UDM, an SMF instance identity (ID) for the given UE and PDU session including the associated DNN, S-NSSAI, 5G VN group, and/or SUPI; sending, from the external entity to the functional entity, a request referring to a subscriber, wherein the subscriber is specified as an IP address or IP address range, S-NSSAI, 5G VN group, DNN, and/or SUPI; querying, from the functional entity to the BSF, by using the specified IP address or IP address range, S-NSSAI, 5G VN group, and/or DNN, for a Subscriber Permanent Identifier (SUPI), or list of SUPIs matching the specified IP address or IP address range, S-NSSAI, 5G VN group, DNN, and returning, from the BSF to the functional entity, any matching SUPI or list of SUPIs; and accessing, from the functional entity to the UDM, one or more subscribers' information according to the SUPI or list of SUPIs.

According to a further aspect, the 5GS further comprises a user equipment (UE), and an access network (AN) providing connectivity between the UE and the 5GC, and the 5GC further comprises a Policy and Charging Function (PCF), a Binding Support Function (BSF), further comprising the steps of: establishing a PDU session, at the SMF, by performing a PDU establishment procedure of Ethernet type involving the UE, the UDM and the SMF, linking one or more of a combination of: a Single Network Slice Selection Identifier (S-NSSAI), a 5G virtual network (VN) group, a data network name (DNN), and/or a Subscriber Permanent Identifier (SUPI), associated with the UE's PDU session, and subscribing in the UDM to changes of subscriber information associated with a subscriber identifier (ID) of the PDU session; registering, from the SMF to the UDM, an SMF instance identity (ID) for a given UE and/or PDU session including any combination of: S-NSSAI, 5G VN group, DNN and/or SUPI associated with the UE's PDU session; performing, at the UPF, MAC learning based on MAC addresses for Ethernet frames coming from one or more UEs, and notifying the SMF of any observed added or deleted MAC addresses for each UE; updating, from the SMF to the PCF, with any observed MAC address or MAC addresses linked with the PDU session including any combination of: S-NSSAI, 5G VN group, DNN, and/or SUPI; storing the information of the previous step at the PCF; sending, from the external entity to the functional entity, a request referring to a subscriber, wherein the subscriber is specified as one or more MAC addresses or MAC address ranges; querying, from the functional entity to the BSF, by using the specified one or more MAC addresses or MAC address ranges, S-NSSAI, 5G VN group, and/or DNN, for a Subscriber Permanent Identifier (SUPI), or list of SUPIs matching the specified MAC address or MAC address range, S-NSSAI, 5G VN group, and/or DNN, and returning, from the BSF to the functional entity, a matching SUPI or list of SUPIs; and accessing, from the functional entity to the UDM, one or more subscribers' information according to the SUPI or list of SUPIs.

According to a second aspect of the invention, there is provided a method for application of expected communication behavior information on a communication system, the system comprising an external entity and a 5G system (5GS), wherein the 5GS comprises a 5G core (5GC), wherein the 5GC comprises a functional entity, a Unified Data Management (UDM), a Session Management Function (SMF), and a User Plane Function (UPF), the method comprising the steps: subscribing, from the external entity to the functional entity, one or a set of subscribers to notifications of expected communication behavior information; mapping, at the functional entity, the one or set of subscribers to 5G System (5GS) subscribers and subscribing, for the one or more subscribers, to expected communication behavior information events to the SMF or PCF; sending a confirmation, from the functional entity to the external entity, that the subscription of one or a set of subscribers to notifications of expected communication behavior information has been performed successfully, wherein the confirmation comprises subscription information; detecting, at the UPF, a packet not following the expected communication behavior information, wherein an expected action is dropping the packet or sending a notification, if the expected action is dropping the packet, the packet is dropped, if the expected action is notification: notifying, from the UPF to the SMF via N4 interface or via Service Based Interface (SBI) of a communication behavior information event of a PDU session; updating, from the SMF to the UDM, the expected communication behavior information of the PDU session with the communication behavior information event of the PDU session; if in the step of subscribing the functional entity subscribed to the PCF for a PDU session or sessions, notifying, from the PCF to the functional entity subscribed to the expected communication behavior information, of the expected communication behavior information event for the PDU session or sessions; and notifying, from the functional entity to the external entity, of the expected communication behavior information event.

According to a further aspect, in the step of subscribing, the external entity subscribes to notifications of a single subscriber by using a Generic Public Subscription Identifier (GPSI), a Subscriber Permanent Identifier (SUPI), IP address or MAC address or the external entity subscribes to a set of subscribers by using an IP range, 5G virtual networks (VNs), data network names (DNNs), or slices, or a combination of any of these.

According to a further aspect, the functional entity is a Network Exposure Function, NEF.

According to a further aspect, the external entity is a third party, a user management system of an enterprise network, or a system administrator.

According to a third aspect of the invention, there is provided a communication system configured to set up expected communication behavior information, the system comprising an external entity and a 5G system (5GS), wherein the 5GS comprises a 5G core (5GC), wherein the 5GC comprises a functional entity, a Unified Data Management (UDM), a Session Management Function (SMF), and a User Plane Function (UPF), wherein: the external entity is configured to perform an Application Programming Interface (API) call via an API of the functional entity and to set up an expected communication behavior for a subscriber or set of subscribers, a data network name (DNN), a 5G virtual network (VN), a slice or any combination thereof that the functional entity is allowed to manage; if the subscriber or set of subscribers is referred to via an IP address, IP address range, MAC address or MAC address range, the functional entity is configured to map the address or address range to a subscriber or set of subscribers; the UDM is configured to update, by adding and storing, expected communication behavior information into one or more subscriber's information, wherein the subscriber information indicates none, one or a combination of: DNN, 5G VN group, and/or slice; the functional entity is configured to send a confirmation, to the external entity, that the set up the expected communication behavior for a subscriber or set of subscribers, a DNN, a 5G VN, a slice or any combination thereof, has been performed successfully; if the subscriber or set of subscribers have an active Protocol Data Unit (PDU) session or PDU sessions, wherein the SMF is subscribed in the UDM to changes of subscriber information of the subscriber or set of subscribers of the PDU session or PDU sessions, the UDM is configured to notify, to the subscribed SMF, of a change in the subscriber information, if the subscriber or set of subscribers have no active PDU sessions, whenever a SMF performs a PDU establishment procedure, the SMF is configured to retrieve the subscriber information from the UDM, wherein the retrieved subscriber information contains the updated expected communication behavior information; for active PDU sessions, the SMF is configured to perform a N4 session modification procedure to the UPF and to update the expected communication behavior in the UPF via N4 interface; for new PDU session establishments, the SMF is configured to signal, via the N4 interface, to the UPF, the expected communication behavior information.

According to a further aspect, wherein when the external entity sets up the expected communication behavior for a subscriber or set of subscribers, a DNN, a 5G VN, a slice or any combination thereof that the functional entity is allowed to manage, the external entity is further configured to subscribe to the functional entity to notifications of expected communication behavior information for one or a set of subscribers, DNN, a 5G VN, a slice or any combination thereof; and wherein when the functional entity sends the confirmation, to the external entity, that the set up of the expected communication behavior has been performed successfully, the confirmation further that the subscription of one or a set of subscribers, DNN, 5G VN, slice or any combination thereof, to notifications of expected communication behavior information has been performed successfully and subscription information.

According to a further aspect, the functional entity is configured to: receive a subscriber specified as a Subscriber Permanent Identifier (SUPI), and access the subscriber information at the UDM by using the SUPI; or the functional entity is configured to: receive a subscriber specified as a Generic Public Subscription Identifier (GPSI), obtain, from the UDM, a Subscriber Permanent Identifier (SUPI), by using the GPSI, and access the subscriber information at the UDM by using the SUPI.

According to a further aspect of the invention, the 5GS further comprises a user equipment (UE), and an access network (AN) providing connectivity between the UE and the 5GC, and the 5GC further comprises a Policy and Charging Function (PCF), and a Binding Support Function (BSF), wherein: the SMF is configured to establish a PDU session by being configured to: perform a PDU establishment procedure of IP type involving the UE, the UDM and the SMF, link an IP address or IP prefix to a UE's PDU session and with one or more of a combination of: a Single Network Slice Selection Identifier (S-NSSAI), a 5G virtual network (VN) group, a Data Network Name (DNN), and/or a Subscriber Permanent Identifier (SUPI) associated with the UE's PDU session, and subscribe in the UDM to changes of subscriber information associated with a subscriber identifier (ID) associated with the PDU session; the SMF is configured to notify to the PCF, the linked IP address or IP prefix of the UE's PDU session with the associated DNN, S-NSSAI, 5G VN group, and/or SUPI; the PCF is configured to update and store to the BSF, the assigned IP address or IP prefix of the UE's PDU session with the associated DNN, S-NSSAI, 5G VN group, and/or SUPI; the SMF is configured to register to the UDM, an SMF instance identity (ID) for the given UE and PDU session including the associated DNN, S-NSSAI, 5G VN group, and/or SUPI; the external entity is configured to send, to the functional entity, a request referring to a subscriber, wherein the subscriber is specified as an IP address or IP address range, S-NSSAI, 5G VN group, DNN, and/or SUPI; the functional entity is configured to query, to the BSF, by using the specified IP address or IP address range, S-NSSAI, 5G VN group, and/or DNN, for a Subscriber Permanent Identifier (SUPI), or list of SUPIs matching the specified IP address or IP address range, S-NSSAI, 5G VN group, DNN, the BSF is configured to return, to the functional entity, any matching SUPI or list of SUPIs; and the functional entity is configured to access one or more subscribers' information, at the UDM, according to the SUPI or list of SUPIs.

According to a further aspect, the 5GS further comprises a user equipment (UE), and an access network (AN) providing connectivity between the UE and the 5GC, and the 5GC further comprises a Policy and Charging Function (PCF), a Binding Support Function (BSF), wherein: the SMF is configured to establish a PDU session by being configured to: perform a PDU establishment procedure of Ethernet type involving the UE, the UDM and the SMF, link one or more of a combination of: a Single Network Slice Selection Identifier (S-NSSAI), a 5G virtual network (VN) group, a data network name (DNN), and/or a Subscriber Permanent Identifier (SUPI), associated with the UE's PDU session, and subscribe in the UDM to changes of subscriber information associated with a subscriber identifier (ID) of the PDU session; the SMF is configured to register, to the UDM, an SMF instance identity (ID) for a given UE and/or PDU session including any combination of: S-NSSAI, 5G VN group, DNN and/or SUPI associated with the UE's PDU session; the UPF is configured to perform MAC learning based on MAC addresses for Ethernet frames coming from one or more UEs, and to notify the SMF of any observed added or deleted MAC addresses for each UE; the SMF is configured update to the PCF, with any observed MAC address or MAC addresses linked with the PDU session including any combination of: S-NSSAI, 5G VN group, DNN, and/or SUPI; the PCF is configured to store any observed MAC address or MAC addresses linked with the PDU session including any combination of: S-NSSAI, 5G VN group, DNN, and/or SUPI; the external entity is configured to send, to the functional entity, a request referring to a subscriber, wherein the subscriber is specified as one or more MAC addresses or MAC address ranges; the functional entity is configured to query, to the BSF, by using the specified one or more MAC addresses or MAC address ranges, S-NSSAI, 5G VN group, and/or DNN, for a Subscriber Permanent Identifier (SUPI), or list of SUPIs matching the specified MAC address or MAC address range, S-NSSAI, 5G VN group, and/or DNN, the BSF is configured to return a matching SUPI or list of SUPIs to the functional entity; and the functional entity is configured to access one or more subscribers' information in the UDM according to the SUPI or list of SUPIs.

According to a fourth aspect of the invention, there is provided a communication system configured to apply expected communication behavior information, the system comprising an external entity and a 5G system (5GS), wherein the 5GS comprises a 5G core (5GC), wherein the 5GC comprises a functional entity, a Unified Data Management (UDM), a Session Management Function (SMF), and a User Plane Function (UPF), wherein: the external entity is configured to subscribe, to the functional entity, one or a set of subscribers to notifications of expected communication behavior information; the functional entity is configured to map, the one or set of subscribers to 5G System (5GS) subscribers and to subscribe, for the one or more subscribers, to expected communication behavior information events to the SMF or PCF; the functional entity is configured to send a confirmation to the external entity, that the subscription of one or a set of subscribers to notifications of expected communication behavior information has been performed successfully, wherein the confirmation comprises subscription information; the UPF is configured to detect a packet not following the expected communication behavior information, wherein an expected action is to drop the packet or send a notification, if the expected action is drop the packet, the UPD is configured to drop the packet, if the expected action is notification: the UPF is configured to notify, to the SMF, via N4 interface or via Service Based Interface (SBI) of a communication behavior information event of a PDU session; the SMF is configured to update the UDM, with the expected communication behavior information of the PDU session with the communication behavior information event of the PDU session; if the functional entity subscribed to the PCF for a PDU session or sessions, the PCF is configured to notify, to the functional entity subscribed to the expected communication behavior information, of the expected communication behavior information event for the PDU session or sessions; and the functional entity is configured to notify, to the external entity, of the expected communication behavior information event.

Other aspects, features, and advantages will be apparent from the summary above, as well as from the description that follows, including the figures and the claims.

Exemplary embodiments of the present invention apply the concept of Allowed Address Pairs (AAPs) to the 5GS where the concept of "port" to which generated rules are applied in the AAP configuration maps to a subscriber or subscribers.

Figure 3:
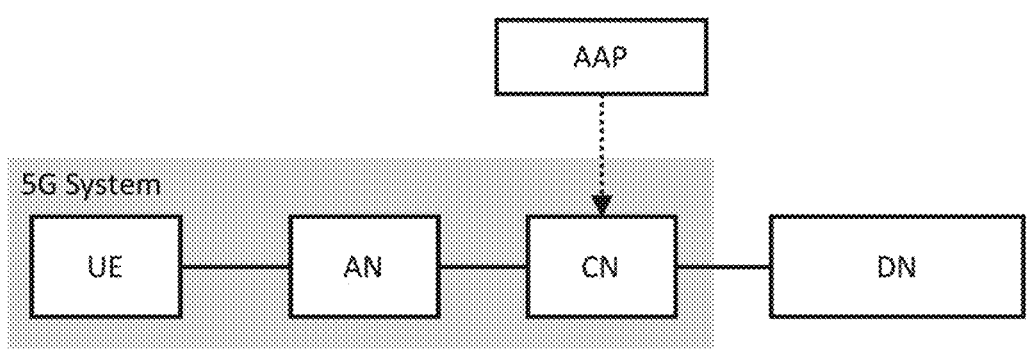
FIG. 3 illustrates the communication of AAPs applied to a 5G system according to an embodiment of the invention.

FIG. 3 illustrates the communication of AAPs applied to a 5GS system according to an embodiment of the invention. In this configuration, the 5G Core Network (5GC) enforces the UE communication behavior as per AAPs.

The considered Protocol Data Unit (PDU) session types are those of IP type and Ethernet type.

According to the invention, there is provided a method that defines a capability for allowing a functional entity, such as, for example, the NEF, to expose the following functionality.

An authorized external entity (i.e. third party) can for a given target, specify allowed traffic as defined by a target MAC address or a target MAC address range or a target IP address or IP address range (e.g. CIDR notation) or subscriber identifier or subscriber identifier range.

The given target may be specified as any or a combination of the following:
- Subscriber or subscribers, identified by: a Subscription Permanent Identifier (SUPI) or SUPI range, General Purpose Serial Interface (GPSI) or GPSI range or another ID mapped to a given subscriber; for IP (L3) connectivity, the IP address of the subscriber or any subscriber having an IP in a given IP address range; and for Ethernet (L2) connectivity, the MAC address of the subscriber or any subscriber having a MAC address in a given MAC address range;
- data network name (DNN) for which an AAP rule applies;
- 5G VN group (see TS 23.501, 5.8.2.13) for which an AAP rule applies;
- slice (e.g. identified by a Single-Network Slice Selection Assistance Information (S-NSSAI)) for which an AAP rule applies.

Setup of Communication Behavior Information

Figure 4:
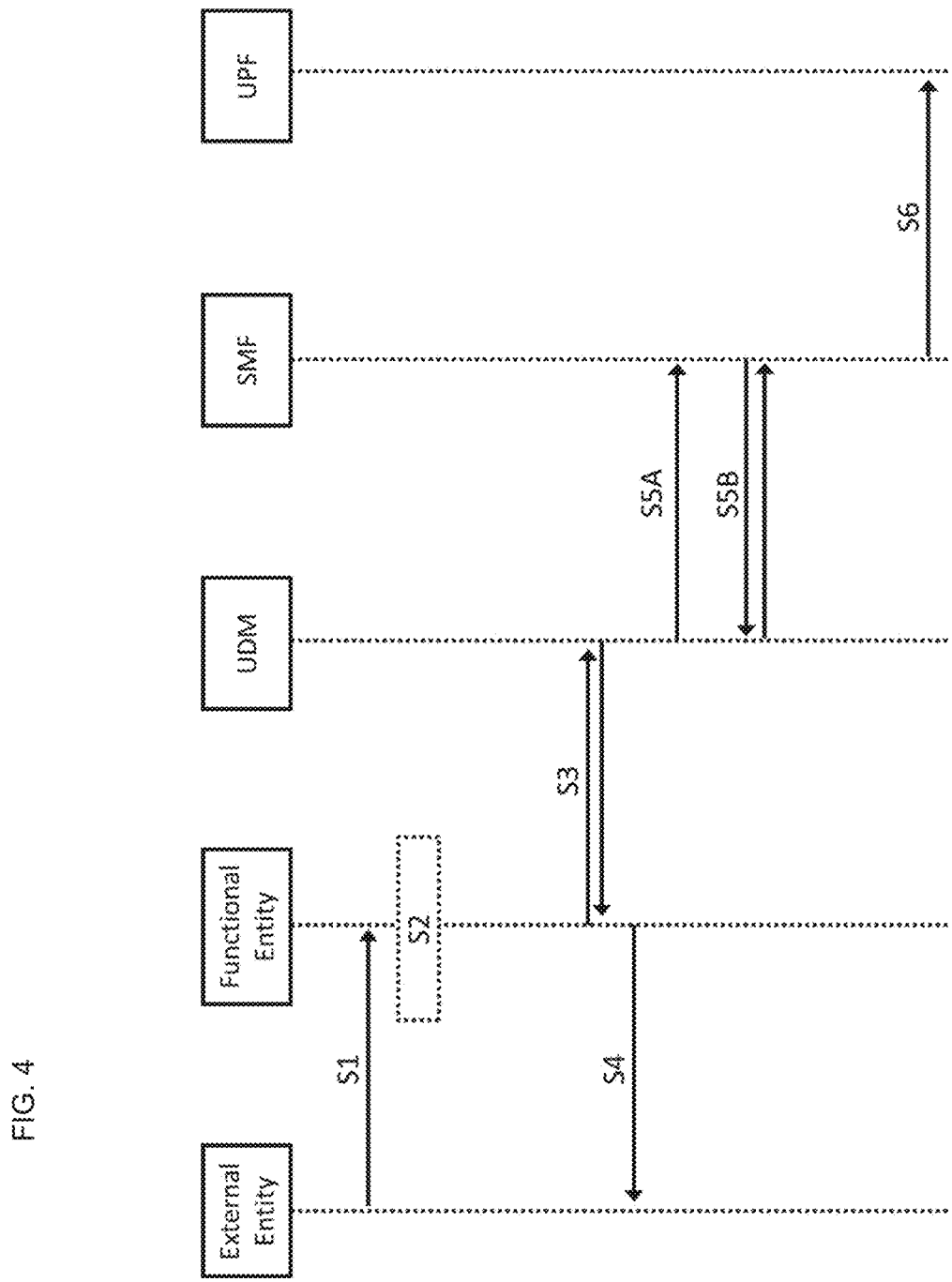
FIG. 4 illustrates a flowchart for the setup of the communication behavior information according to an embodiment of the invention.

The information flow in order to setup, by an external entity, the expected communication behavior is shown in FIG. 4, which is described in detail as follows. The present invention defines a Functional Entity that implements the method and interacts with the external entity as per de invention. Given the external exposure function of the Functional Entity, this functionality could, for example, be combined with that of the NEF.

In step S1, the external entity (for example, a third-party, a user management system of an enterprise network, a system administrator, or the like) performs an API call via the functional entity API in order to set up an expected communication behavior for a specific subscriber or set of subscribers, DNN, 5G virtual network (VN), slice or combination of the previous parameters that the functional entity is allowed to manage. For example: specific GPSI, all subscribers of a specific 5G VN, specific GPSI+DNN, etc.

In step S2, (if the subscriber is not explicitly indicated, for example, no SUPI or GPSI is used to refer to the subscriber, this step is skipped), if the subscriber or group of subscribers is referred to via an IP address, IP address range or MAC address range, the NEF maps the address or address range to a subscriber (for example, SUPI). If a GPSI is employed to identify a subscriber, the functional entity can obtain the corresponding SUPI from the Unified Data Management (UDM).

In step S3, the functional entity adds, to one or more subscribers' information matching the criteria, the expected communication behavior information. This preferably includes any or the following parameters to limit where the expected communication behavior applies: data network name (DNN), 5G VN group, and/or slice. The subscriber information indicates none, one or a combination of: DNN, 5G VN group, and/or slice. The reason why this information is stored in the UDM and not in the Policy Changing Function (PCF) is that PCF rules are defined in 3GPP specifications as "A rule is a set of policy information elements associated with a PDU session, or with service data flows (for example, with a PCC rule)". However, these rules apply to a subscriber and are thus stored in the UDM.

In step S4, the functional entity send a confirmation to the external entity that the setting up of an expected communication behavior for a subscriber or set of subscribers, a DNN, a 5G VN, a slice or any combination thereof, has been performed successfully. Further, depending on local configuration (for example, privacy settings), the response of step S4 may include the subscribers to which the operation was performed on (e.g. SUPI or GPSI).

Optionally, step S1 may further comprise subscribing, from the external entity to the functional entity, one or a set of subscribers, DNN, 5G VN, slice or any combination thereof, to notifications of expected communication behavior. If this is performed in step S1, the confirmation of step S4 further comprises information that the subscription of one or a set of subscribers, DNN, 5G VN, slice or any combination thereof, to notifications of expected communication behavior information has been performed successfully as well as the subscription information.

In step S5, two distinctions are made:

For existing PDU sessions, the responsible Session Management Function (SMF) will be already subscribed to changes to the subscriber information. Thus, in this case, if any changes occur, the UDM notifies, in step S5A, to the subscribed SMFs, of the change in the subscriber information.

Alternatively, for subscribers without active PDU sessions, whenever a SMF performs the PDU establishment procedure, the UDM retrieves, in step S5B, the subscriber information from the SMF, which will contain the updated expected communication behavior information.

For existing PDU sessions, the SMF performs a N4 session modification procedure and updates, in step S6, the expected communication behavior information in the UPF via the N4 interface. For new PDU session establishments, the SMF includes the expected communication behavior information in the N4 signaling towards the UPF. In other words, the SMF performs the application of expected communication behavior to the UPF packet processing rules by updating the existing session with parameters or by adding parameters to session creation parameters.

Mapping of Subscriber Information in Order to Set Subscriber Information on UDM

Figure 5:
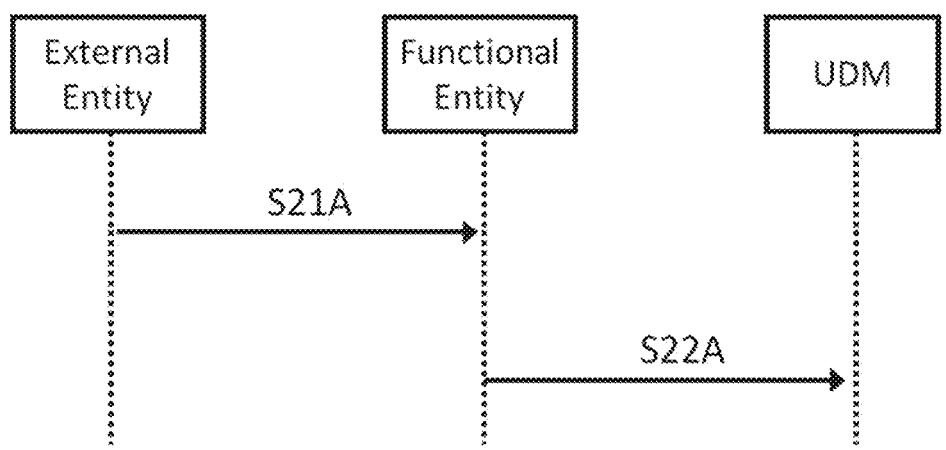
FIG. 5 illustrates a flowchart for accessing subscriber information via SUPI according to an embodiment of the invention.

If the external entity already refers to a subscriber via a SUPI, the SUPI can already be employed to access the subscriber information. FIG. 5 illustrates an external entity accessing subscriber information via SUPI. In step S21A, the external entity sends a message to the functional entity with the subscriber specified as SUPI. In step S22A, the functional entity accesses the subscriber information on the UDM by using the SUPI.

Figure 6:
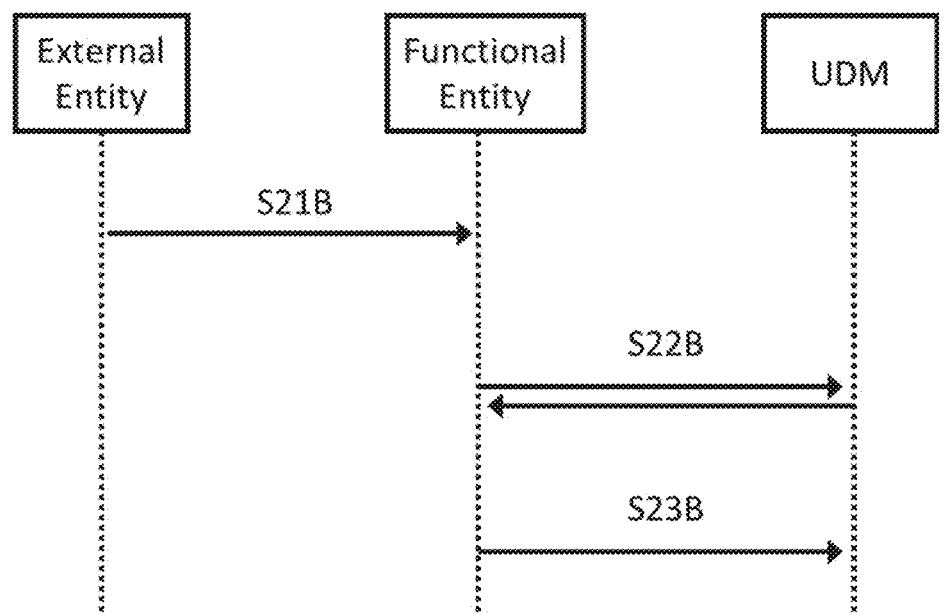
FIG. 6 illustrates a flowchart for accessing subscriber information via GPSI according to an embodiment of the invention.

If the external entity refers to a subscriber via a GPSI the procedure illustrated in FIG. 6 is used. In step S21B, the external entity sends a message to the functional entity with the subscriber specified as GPSI. In step S22B, the functional entity uses the GPSI to obtain a SUPI from the UDM (ID translation result via API call). In step S23B, the functional entity accesses the subscriber information on the UDM by using the SUPI.

In order to support addressing a subscriber via an IP address or a MAC address or set of subscribers via an IP address range or MAC address range, the Binding Support Function (BSF) needs to be used (see FIG. 3).

Figure 7:
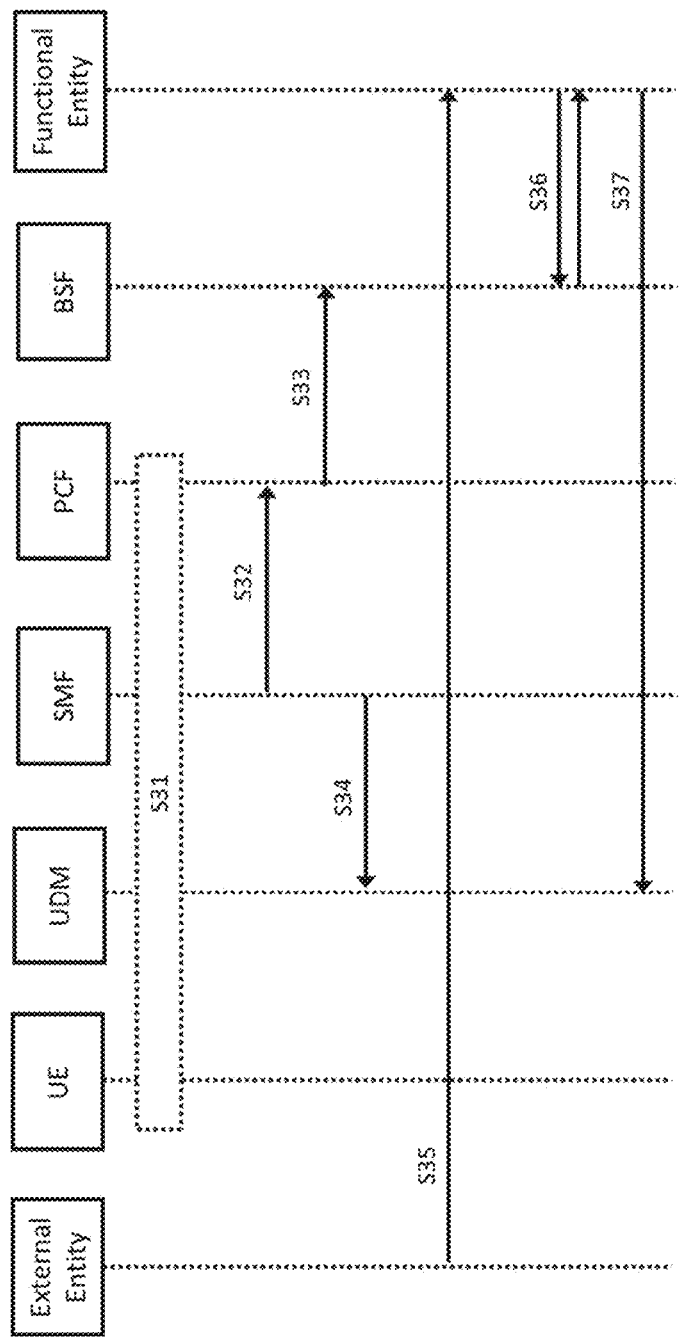
FIG. 7 illustrates a flowchart for accessing subscriber information via IP address or IP address range according to an embodiment of the invention.

FIG. 7 illustrates a flowchart for accessing subscriber information via IP address or IP address range.

In FIG. 7, a PDU establishment procedure of IP type, either v4, v6 or v4v6 (TS 23.502, 4.3.2) is performed at the SMF as part of a PDU establishment procedure involving a user equipment (UE), the UDM and the SMF.

In step S31, as part of this procedure, the UE is assigned an IP address or IP prefix (either by the SMF itself or by an external system such as for example an authentication, authorization and accounting server, that is an AAA server hosted by the external entity), wherein the IP address or IP prefix is linked to a UE's PDU session and with one or more of a combination of: a Single Network Slice Selection Identifier (S-NSSAI), a 5G virtual network (VN) group, a data network name (DNN), and/or a Subscriber Permanent Identifier (SUPI) associated with the UE's PDU session. A PDU session is established, and the SMF subscribes in the UDM to changes of the subscriber information associated with a subscriber identifier (ID) associated with the PDU session of this given subscriber (e.g. if the subscriber is purged the SMF is notified and the PDU session is released by the SMF).

In step S32, once the PDU session is established, the SMF notifies the PCF with the linked IP address/prefix(es) of the UE's PDU session with the associated DNN, S-NSSAI, 5G VN group and/or SUPI. This may be done, for example, as specified in TS23.502, 4.3.2.2.1, step 9.

In step S33, the PCF then updates and stores the IP addresses or IP prefix of the UE's PDU session in the BSF, which comprises, as per TS 29.521, 5.6.2.2, the DNN, S-NSSAI, 5G VN group and/or SUPI.

In step S34, the SMF registers itself in the UDM for the given UE and PDU session. S-NSSAI, 5G VN group and DNN are also included, i.e., the SMF registers its SMF instance ID for a given PDU session ID.

In step S35, the external entity sends a request referring to a subscriber, specified as an IP address or IP address range, S-NSSAI, 5G VN group, DNN, and/or SUPI, to the functional entity.

In step S36, the functional entity queries the BSF to obtain a SUPI or list of SUPIs matching the specified IP address or IP address range and any scoping factors such as S-NSSAI, 5G VN group and/or DNN. The BSF returns the functional entity any matching SUPIs.

Lastly, in step S37, the functional entity can then use the obtained SUPI(s) to access the subscriber information in the UDM.

In the case of Ethernet PDU sessions, as specified in TS 23.501, 5.6.10.2, the procedure for accessing the subscriber information is different, as neither a MAC nor an IP address is allocated by the 5GS to the UE for a PDU session. Rather, the 5GS stores the source MAC addresses in packets received from the UE, and associates those with the PDU session.

Figure 8:
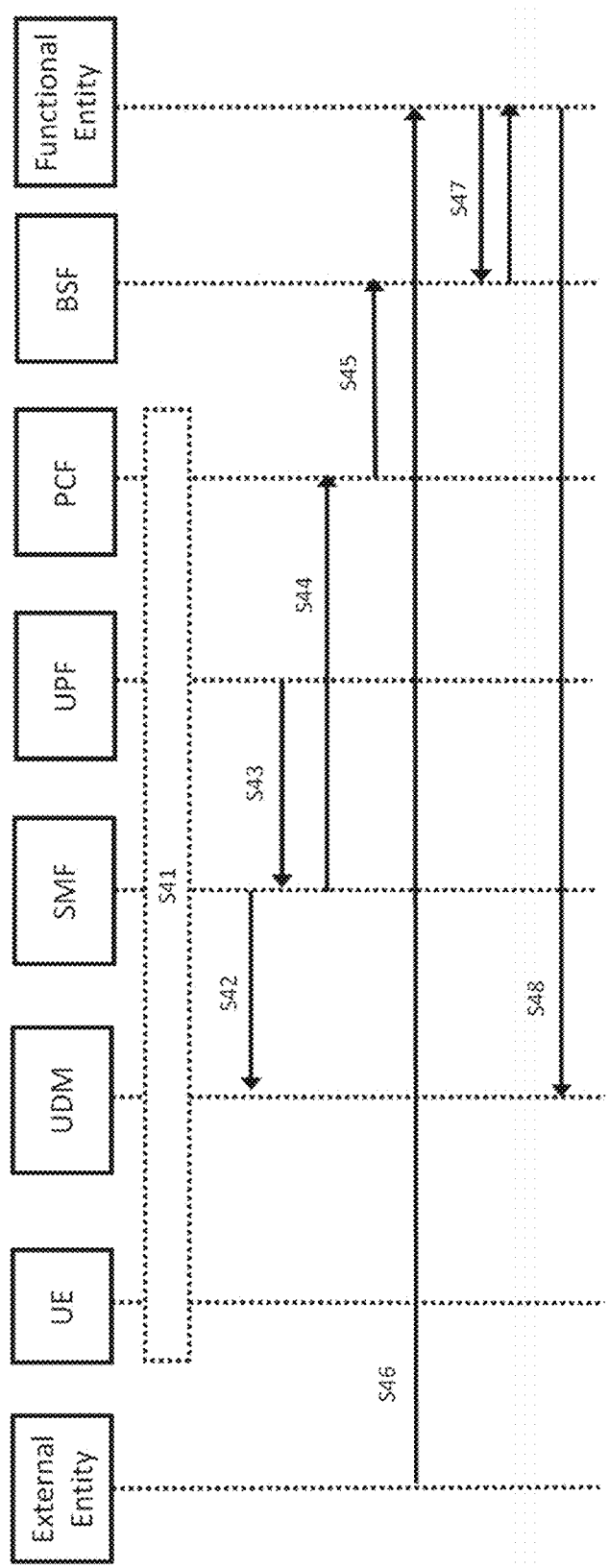
FIG. 8 illustrates a flowchart for accessing subscriber information via MAC address according to an embodiment of the invention.

FIG. 8 illustrates a flowchart for accessing subscriber information via MAC address.

In FIG. 8, a PDU establishment procedure of Ethernet type (TS 23.502, 4.3.2) is performed at the SMF as part of a PDU establishment procedure involving a user equipment (UE), the UDM and the SMF, and a PDU session is established, in step S41.

In step S41, as part of this procedure: the SMF links one or more of a combination of: a Single Network Slice Selection Identifier (S-NSSAI), a 5G virtual network (VN) group, a data network name (DNN), and/or a Subscriber Permanent Identifier (SUPI) to the UE's PDU session, and subscribes in the UDM to changes of subscriber information associated with a subscriber ID of the PDU session.

In step S42, once the PDU session is established, the SMF registers itself in the UDM for the given UE and/or PDU session. S-NSSAI, 5G VN group, DNN and/or SUPI associated with the UE's PDU session are also included. For example, the SMF registers an SMF instance ID for a given PDU session ID.

In step S43, the UPF performs MAC learning based on the source MAC addresses for Ethernet frames coming from any given UE. The UPF notifies the SMF of the observed MAC addresses for each UE, i.e. it notifies the SMF of MAC address addition and/or deletion based on MAC learning.

In step S44, the SMF updates the PCF with the observed MAC addresses list for the given PDU session, i.e. the MAC addresses linked to the PDU session. The PCF stores S45 the information provided in step S44, which comprises any combination of: the S-NSSAI, 5G VN group, DNN and/or SUPI.

Thereafter, in step S46, the external entity sends, to the functional entity, a request referring to a subscriber as one or more MAC addresses or MAC address ranges.

In step S47, in order to get the subscriber information, the functional entity queries the BSF to obtain a SUPI matching the MAC address or MAC address range and any scoping factors such as S-NSSAI, 5G VN group and DNN. The BSF returns the functional entity any matching SUPI or list of SUPIs.

Lastly, in step S48 the functional entity can then use the obtained SUPI(s) to access one or more subscribers' information in the UDM.

Application of Communication Behavior Information

According to one embodiment, a method is provided defining two actions to be performed if detecting behavior that falls outside the expected communication behavior is provided (for example, a UE that is sending data packets to an address it is not allowed to). The two actions to be performed are: 1) drop the packets; and 2) notify. In the first action, the UPF simply drops the packets that do not match expected communication behavior for a given PDU session. In the second action, the following procedure, as illustrated in FIG. 9, is followed.

Figure 9:
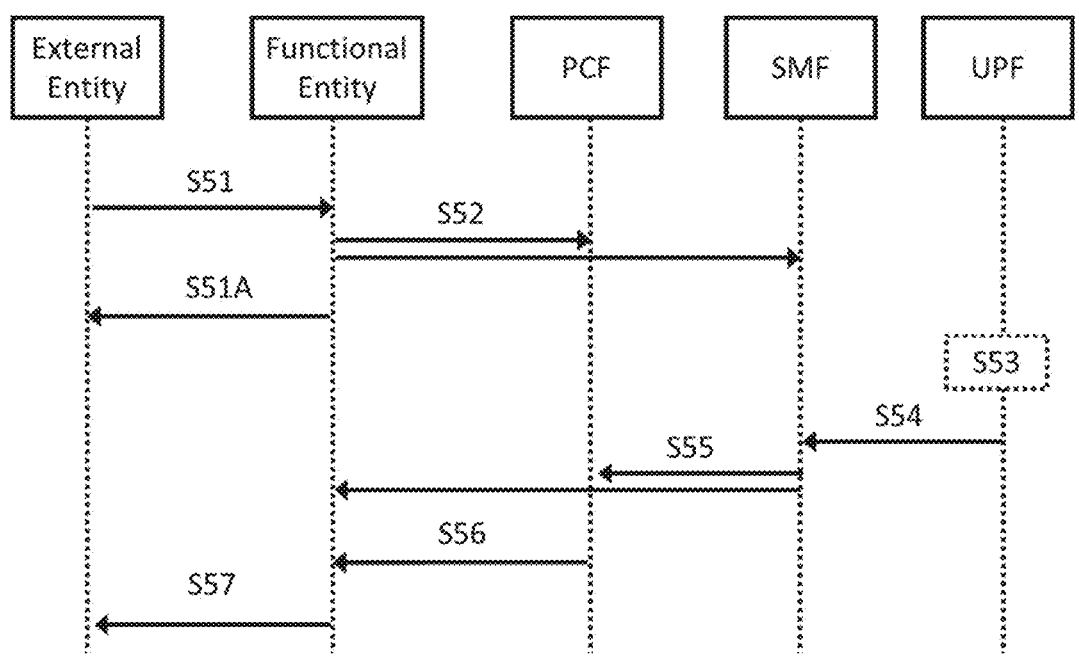
FIG. 9 illustrates a flowchart for notification of an expected communication behavior event according to an embodiment of the invention.

FIG. 9 illustrates a flowchart of notification of expected communication behavior event.

First, in step S51, the external entity subscribes to the functional entity to notifications of expected behavior events. The external entity may subscribe to notifications of a single subscriber (e.g. SUPI, GPSI, IP address or MAC address) or to a group of subscribers (e.g. IP range, specific 5G VN(s), DNN(s) or slice(s)) or a combination of several parameters (e.g. IP range in a specific slice).

In step S52, the functional entity maps the subscribers to 5GS subscribers and subscribes, for the given subscriber or set of subscribers, to the expected behavior events for the given subscriber(s) on the relevant SMF(s) or PCF(s), i.e. the ones containing state information on the relevant PDU sessions. A given UE may have different PDU sessions on different SMFs/PCFs (e.g. simultaneous slices). The functional entity can either directly subscribe to UE communication behavior notifications from the SMF or via the PCF. The functional entity subscribes to UE communication behavior notifications only for the relevant PDU sessions.

In step S51A, the functional entity sends a confirmation that step S51, i.e. the subscription to notifications of expected behavior events, was performed successfully to the external entity. The confirmation also comprises the subscription information.

In order to find out what subscriber (SUPI) the functional entity needs to subscribe to, the methods from any one of FIG. 6 to FIG. 8 are performed, depending on the needs.

In step S53, the UPF detects a packet not following the expected communication behavior where the expected action is notify ("notification"). If the expected action is drop the packet, the packet is dropped and the following steps are not performed.

In step S54, the UPF notifies the SMF via the N4 interface or via SBI from a NF Service in the UPF, i.e. the SMF is notified about a communication behavior event for PDU session.

In step S55 the SMF sends the event data to the PCF and any other subscribed functional entity, i.e. the SMF sends the expected communication behavior data with the event data. The functional entity maintains an up-to-date list containing the necessary subscriptions to SMF(s) and/or PCF(s).

If in step S52, a functional entity subscribed to a PCF for a PDU session or sessions, the PCF notifies, in step S56, to any subscribed functional entity of the expected communication behavior event.

Lastly, in step S57, the functional entity notifies to the subscribed NF service consumers of the expected communication behavior event.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for setting up expected communication behavior information in a communication system, the system comprising an external entity and a 5G system (5GS), wherein the 5GS comprises a 5G core (5GC), wherein the 5GC comprises a functional entity, a Unified Data Management (UDM), a Session Management Function (SMF), and a User Plane Function (UPF), the method comprising:

performing, by the external entity, an Application Programming Interface (API) call via an API of the functional entity and setting up an expected communication behavior for a subscriber or set of subscribers, a data network name (DNN), a 5G virtual network (VN), a slice or a combination thereof that the functional entity is allowed to manage;

based on the subscriber or set of subscribers being referred to via an IP address, IP address range, media access control (MAC) address or MAC address range, mapping, at the functional entity, the address or address range to the subscriber or set of subscribers;

updating, at the UDM, by adding and storing, expected communication behavior information into subscriber information of one or more subscribers;

sending a confirmation, from the functional entity to the external entity, that the setting up of the expected communication behavior for the subscriber or set of subscribers, the DNN, the 5G VN, the slice or the combination thereof has been performed successfully;

based on the subscriber or set of subscribers having an active Protocol Data Unit (PDU) session or PDU sessions, wherein the SMF is subscribed in the UDM to changes of subscriber information of the subscriber or set of subscribers of the PDU session or PDU sessions, notifying, from the UDM to the subscribed SMF, of a change in the subscriber information; and for active PDU sessions, performing, from the SMF to the UPF, an N4 session modification procedure and updating the expected communication behavior in the UPF via an N4 interface;

wherein the 5GS further comprises a user equipment (UE) and an access network (AN) providing connectivity between the UE and the 5GC, and the 5GC further comprises a Policy and Charging Function (PCF) and a Binding Support Function (BSF), and wherein the method further comprises:

establishing a PDU session, at the SMF, by performing a PDU establishment procedure of Ethernet type involving the UE, the UDM and the SMF, linking one or more of a combination of: a Single Network Slice Selection Identifier (S-NSSAI), a 5G VN group, a DNN, and/or a Subscriber Permanent Identifier (SUPI), associated with the UE's PDU session, and subscribing in the UDM to changes of subscriber information associated with a subscriber identifier of the PDU session;

registering, from the SMF to the UDM, an SMF instance identity for a given UE and/or PDU session including a combination of: the S-NSSAI, the 5G VN group, the DNN and/or the SUPI associated with the UE's PDU session;

performing, at the UPF, MAC learning based on MAC addresses for Ethernet frames coming from one or more UEs, and notifying the SMF of observed added or deleted MAC addresses for each UE;

updating, from the SMF to the PCF, with an observed MAC address or MAC addresses linked with the PDU session including a combination of: the S-NSSAI, the 5G VN group, the DNN, and/or the SUPI;

storing the information of the previous step at the PCF;

sending, from the external entity to the functional entity, a request referring to a subscriber, wherein the subscriber is specified as one or more MAC addresses or MAC address ranges;

querying, from the functional entity to the BSF, by using the specified one or more MAC addresses or MAC address ranges, the S-NSSAI, the 5G VN group, and/or the DNN, for the SUPI, or a list of SUPIs matching the specified MAC address or MAC address range, S-NSSAI, 5G VN group, and/or DNN, and returning, from the BSF to the functional entity, a matching SUPI or list of SUPIs; and accessing, from the functional entity to the UDM, information of one or more subscribers according to the SUPI or the list of SUPIs.

2. The method of claim 1, wherein setting up the expected communication behavior for the subscriber or set of subscribers, the DNN, the 5G VN, the slice or the combination thereof further comprises: subscribing, by the external entity, the subscriber or set of subscribers, the DNN, the 5G VN, the slice or the combination thereof to notifications of expected communication behavior information;

wherein the confirmation indicates that the subscription of the subscriber or set of subscribers, the DNN, the 5G VN, the slice or the combination thereof to notifications of expected communication behavior information has been performed successfully and comprises subscription information.

3. The method of claim 1, further comprising:

receiving, at the functional entity, a subscriber specified as a SUPI; and accessing the subscriber information at the UDM by using the SUPI.

4. The method of claim 1, further comprising:

receiving, at the functional entity, a subscriber specified as a Generic Public Subscription Identifier (GPSI);

obtaining, from the UDM, a SUPI, by using the GPSI; and accessing the subscriber information at the UDM by using the SUPI.

5. The method of claim 1, wherein the functional entity is a Network Exposure Function (NEF); and/or wherein the external entity is a third party, a user management system of an enterprise network, or a system administrator.

6. A method for application of expected communication behavior information on a communication system, the system comprising an external entity and a 5G system (5GS), wherein the 5GS comprises a 5G core (5GC), wherein the 5GC comprises a functional entity, a Unified Data Management (UDM), a Session Management Function (SMF), and a User Plane Function (UPF), the method comprising:

subscribing, by the external entity, one or a set of subscribers to notifications of expected communication behavior information;

mapping, at the functional entity, the one or set of subscribers to 5GS subscribers and subscribing, for the one or set of subscribers, to expected communication behavior information events;

sending a confirmation, from the functional entity to the external entity, that the subscription of the one or set of subscribers to notifications of expected communication behavior information has been performed successfully, wherein the confirmation comprises subscription information;

detecting, at the UPF, a packet not following the expected communication behavior information;

dropping the packet or sending a notification based on whether an expected action is dropping the packet or sending a notification;

wherein in case the expected action is dropping the packet, the packet is dropped;

wherein in case the expected action is sending a notification:

a communication behavior information event of a Protocol Data Unit (PDU) session is notified, from the UPF to the SMF via an N4 interface or via an Service Based Interface (SBI);

the expected communication behavior information of the PDU session is updated, from the SMF to the UDM, with the communication behavior information event of the PDU session;

based on the functional entity being subscribed to a Policy and Charging Function (PCF) for a PDU session or sessions, the expected communication behavior information event for the PDU session or sessions is notified, from the PCF to the functional entity subscribed to the expected communication behavior information; and the expected communication behavior information event is notified from the functional entity to the external entity;

wherein the 5GS further comprises a user equipment (UE) and an access network (AN) providing connectivity between the UE and the 5GC, and the 5GC further comprises the PCF and a Binding Support Function (BSF), and wherein the method further comprises:

establishing a PDU session, at the SMF, by performing a PDU establishment procedure of Ethernet type involving the UE, the UDM and the SMF, linking one or more of a combination of: a Single Network Slice Selection Identifier (S-NSSAI), a 5G virtual network (VN) group, a data network name (DNN), and/or a Subscriber Permanent Identifier (SUPI), associated with the UE's PDU session, and subscribing in the UDM to changes of subscriber information associated with a subscriber identifier of the PDU session;

registering, from the SMF to the UDM, an SMF instance identity for a given UE and/or PDU session including a combination of: the S-NSSAI, the 5G VN group, the DNN and/or the SUPI associated with the UE's PDU session;

performing, at the UPF, media access control (MAC) learning based on MAC addresses for Ethernet frames coming from one or more UEs, and notifying the SMF of observed added or deleted MAC addresses for each UE;

updating, from the SMF to the PCF, with an observed MAC address or MAC addresses linked with the PDU session including a combination of: the S-NSSAI, the 5G VN group, the DNN, and/or the SUPI;

storing the information of the previous step at the PCF;

sending, from the external entity to the functional entity, a request referring to a subscriber, wherein the subscriber is specified as one or more MAC addresses or MAC address ranges;

querying, from the functional entity to the BSF, by using the specified one or more MAC addresses or MAC address ranges, the S-NSSAI, the 5G VN group, and/or the DNN, for the SUPI, or a list of SUPIs matching the specified MAC address or MAC address range, S-NSSAI, 5G VN group, and/or DNN, and returning, from the BSF to the functional entity, a matching SUPI or list of SUPIs; and accessing, from the functional entity to the UDM, information of one or more subscribers according to the SUPI or the list of SUPIs.

7. The method of claim 6, wherein the subscribing further comprises:

subscribing, by the external entity, to notifications of a single subscriber by using a Generic Public Subscription Identifier (GPSI), a SUPI, an IP address or a MAC address; or subscribing, by the external entity, to a set of subscribers by using an IP range, 5G VNs, DNNs, or slices, or a combination thereof.

8. The method of claim 6, wherein the functional entity is a Network Exposure Function (NEF); and/or wherein the external entity is a third party, a user management system of an enterprise network, or a system administrator.

9. A communication system for setting up expected communication behavior information, the system comprising:

an external entity; and a 5G system (5GS), wherein the 5GS comprises a 5G core (5GC), wherein the 5GC comprises a functional entity, a Unified Data Management (UDM), a Session Management Function (SMF), and a User Plane Function (UPF);

wherein the external entity is configured to perform an Application Programming Interface (API) call via an API of the functional entity and to set up an expected communication behavior for a subscriber or set of subscribers, a data network name (DNN), a 5G virtual network (VN), a slice or a combination thereof that the functional entity is allowed to manage;

wherein the functional entity is configured to map the address or address range to a subscriber or set of subscribers based on the subscriber or set of subscribers being referred to via an IP address, an IP address range, a media access control (MAC) address or a MAC address range;

wherein the UDM is configured to update, by adding and storing, expected communication behavior information into subscriber information of one or more subscribers;

wherein the functional entity is configured to send a confirmation, to the external entity, that the setup of the expected communication behavior for the subscriber or set of subscribers, the DNN, the 5G VN, the slice or the combination thereof has been performed successfully;

wherein the UDM is configured to notify, to the subscribed SMF, of a change in the subscriber information based on the subscriber or set of subscribers having an active Protocol Data Unit (PDU) session or PDU sessions, wherein the SMF is subscribed in the UDM to changes of subscriber information of the subscriber or set of subscribers of the PDU session or PDU sessions;

wherein the SMF is configured to retrieve the subscriber information from the UDM, wherein the retrieved subscriber information contains the updated expected communication behavior information, based on the subscriber or set of subscribers having no active PDU sessions, whenever the SMF performs a PDU establishment procedure;

wherein the SMF is configured to perform, for active PDU sessions, an N4 session modification procedure to the UPF and to update the expected communication behavior in the UPF via an N4 interface;

wherein the SMF is configured to signal, for new PDU session establishments, via the N4 interface, to the UPF, the expected communication behavior information;

wherein the 5GS further comprises a user equipment (UE), and an access network (AN) providing connectivity between the UE and the 5GC, and the 5GC further comprises a Policy and Charging Function (PCF), a Binding Support Function (BSF);

wherein the SMF is configured to establish a PDU session by:
  performing a PDU establishment procedure of Ethernet type involving the UE, the UDM and the SMF,
  linking one or more of a combination of: a Single Network Slice Selection Identifier (S-NSSAI), a 5G VN group, a DNN, and/or a Subscriber Permanent Identifier (SUPI), associated with the UE's PDU session, and
  subscribing in the UDM to changes of subscriber information associated with a subscriber identifier of the PDU session;

wherein the SMF is configured to register, to the UDM, an SMF instance identity for a UE and/or PDU session including a combination of: the S-NSSAI, the 5G VN group, the DNN and/or the SUPI associated with the UE's PDU session;

wherein the UPF is configured to perform MAC learning based on MAC addresses for Ethernet frames coming from one or more UEs, and to notify the SMF of observed added or deleted MAC addresses for each UE;

wherein the SMF is configured to update the PCF with an observed MAC address or MAC addresses linked with the PDU session including a combination of: the S-NSSAI, the 5G VN group, the DNN, and/or the SUPI;

wherein the PCF is configured to store the observed MAC address or MAC addresses linked with the PDU session including the combination of: the S-NSSAI, the 5G VN group, the DNN, and/or the SUPI;

wherein the external entity is configured to send, to the functional entity, a request referring to a subscriber, wherein the subscriber is specified as one or more MAC addresses or MAC address ranges;

wherein the functional entity is configured to query, to the BSF, by using the specified one or more MAC addresses or MAC address ranges, the S-NSSAI, the 5G VN group, and/or the DNN, for the SUPI, or a list of SUPIs matching the specified MAC address or MAC address range, the S-NSSAI, the 5G VN group, and/or the DNN, wherein the BSF is configured to return a matching SUPI or list of SUPIs to the functional entity; and wherein the functional entity is configured to access information of one or more subscribers in the UDM according to the SUPI or the list of SUPIs.

10. The communication system of claim 9, wherein the external entity is further configured to subscribe to notifications of expected communication behavior information for the subscriber or set of subscribers, the DNN, the 5G VN, the slice or the combination thereof; and
  wherein the confirmation indicates that the subscription of the subscriber or set of subscribers, the DNN, the 5G VN, the slice or the combination thereof to notifications of expected communication behavior information has been performed successfully and comprises subscription information.

11. The communication system of claim 9, wherein the functional entity is configured to: receive a subscriber specified as a SUPI, and access the subscriber information at the UDM by using the SUPI; or
  wherein the functional entity is configured to: receive a subscriber specified as a Generic Public Subscription Identifier (GPSI), obtain, from the UDM, a SUPI by using the GPSI, and access the subscriber information at the UDM by using the SUPI.

12. A communication system for applying expected communication behavior information, the system comprising:
  an external entity; and
  a 5G system (5GS), wherein the 5GS comprises a 5G core (5GC), wherein the 5GC comprises a functional entity, a Unified Data Management (UDM), a Session Management Function (SMF), and a User Plane Function (UPF);
  wherein the 5GS further comprises a user equipment (UE) and an access network (AN) providing connectivity between the UE and the 5GC, and the 5GC further comprises a Policy and Charging Function (PCF) and a Binding Support Function (BSF);
  wherein the external entity is configured to subscribe one or a set of subscribers to notifications of expected communication behavior information;
  wherein the functional entity is configured to map the one or set of subscribers to 5G system (5GS) subscribers and to subscribe, for the one or more subscribers, to expected communication behavior information events;
  wherein the functional entity is configured to send a confirmation to the external entity that the subscription of the subscriber or set of subscribers to notifications of expected communication behavior information has been performed successfully, wherein the confirmation comprises subscription information;
  wherein the UPF is configured to detect a packet not following the expected communication behavior information, wherein an expected action is to drop the packet or send a notification;
  wherein the UPD is configured to drop the packet based on the expected action being to drop the packet;
  wherein, based on the expected action being notification:
    the UPF is configured to notify, to the SMF, via an N4 interface or via a Service Based Interface (SBI) of a communication behavior information event of a Protocol Data Unit (PDU) session;
    the SMF is configured to update the UDM with the expected communication behavior information of the PDU session with the communication behavior information event of the PDU session;
    the PCF is configured to notify, to the functional entity subscribed to the expected communication behavior information, of the expected communication behavior information event for the PDU session or sessions based on the functional entity being subscribed to the PCF for a PDU session or sessions; and
    the functional entity is configured to notify, to the external entity, of the expected communication behavior information event;
  wherein the SMF is configured to establish a PDU session by:
    performing a PDU establishment procedure of Ethernet type involving the UE, the UDM and the SMF,
    linking one or more of a combination of: a Single Network Slice Selection Identifier (S-NSSAI), a 5G virtual network (VN) group, a data network name (DNN), and/or a Subscriber Permanent Identifier (SUPI), associated with the UE's PDU session, and
    subscribing in the UDM to changes of subscriber information associated with a subscriber identifier of the PDU session;
  wherein the SMF is configured to register, to the UDM, an SMF instance identity for a UE and/or PDU session including a combination of: the S-NSSAI, the 5G VN group, the DNN and/or the SUPI associated with the UE's PDU session;

wherein the UPF is configured to perform MAC learning based on MAC addresses for Ethernet frames coming from one or more UEs, and to notify the SMF of observed added or deleted MAC addresses for each UE;

wherein the SMF is configured to update the PCF with an observed MAC address or MAC addresses linked with the PDU session including a combination of: the S-NSSAI, the 5G VN group, the DNN, and/or the SUPI;

wherein the PCF is configured to store an observed MAC address or MAC addresses linked with the PDU session including a combination of: the S-NSSAI, the 5G VN group, the DNN, and/or the SUPI;

wherein the external entity is configured to send, to the functional entity, a request referring to a subscriber, wherein the subscriber is specified as one or more MAC addresses or MAC address ranges;

wherein the functional entity is configured to query, to the BSF, by using the specified one or more MAC addresses or MAC address ranges, the S-NSSAI, the 5G VN group, and/or the DNN, for the SUPI, or a list of SUPIs matching the specified MAC address or MAC address range, the S-NSSAI, the 5G VN group, and/or the DNN;

wherein the BSF is configured to return a matching SUPI or list of SUPIs to the functional entity; and wherein the functional entity is configured to access information of one or more subscribers in the UDM according to the SUPI or the list of SUPIs.

\* \* \* \* \*